Figure 2:
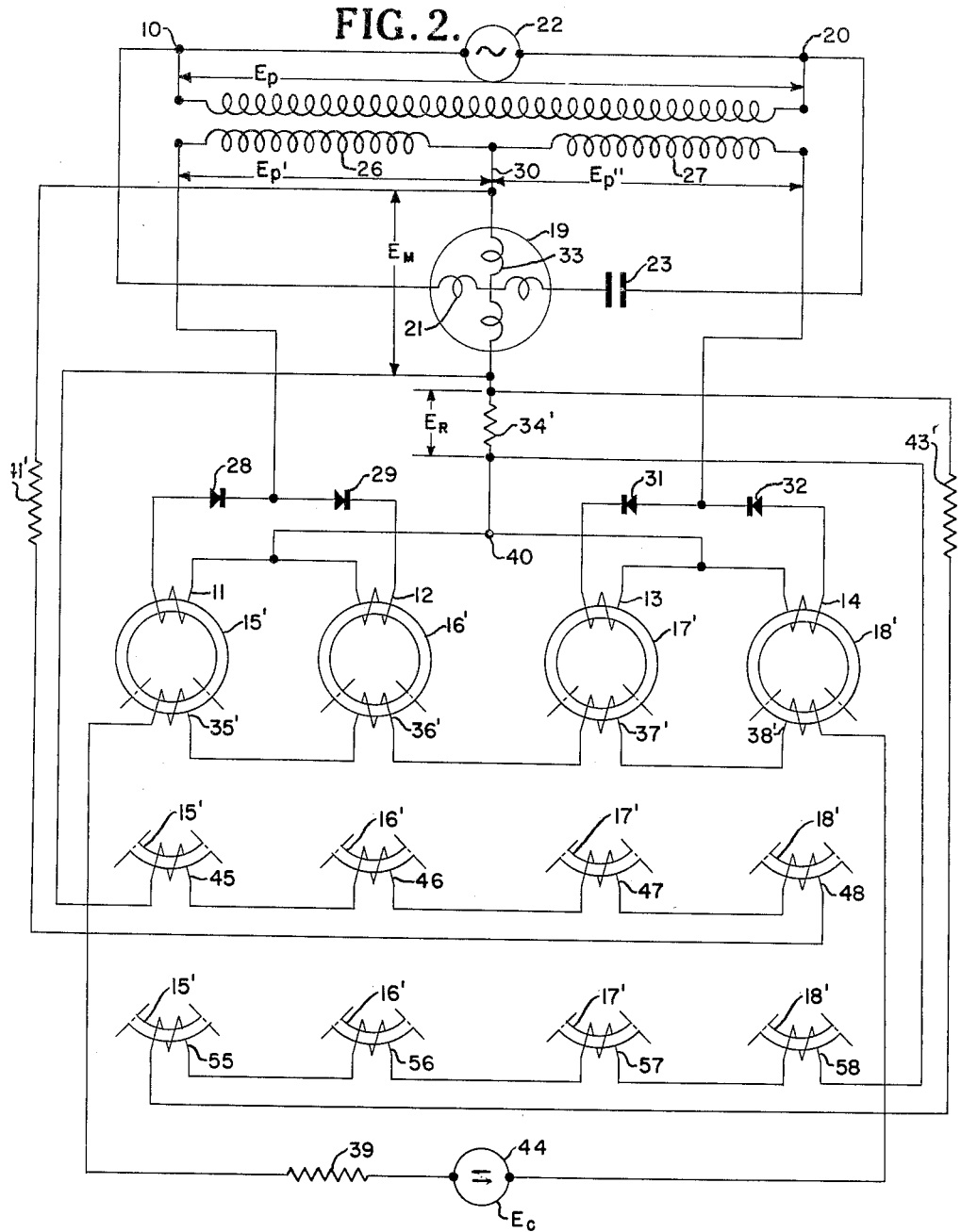

April 24, 1956     W. A. GEYGER     2,743,407
MOTOR CONTROL BY MAGNETIC SERVO AMPLIFIER
Filed Nov. 30, 1953     2 Sheets-Sheet 1
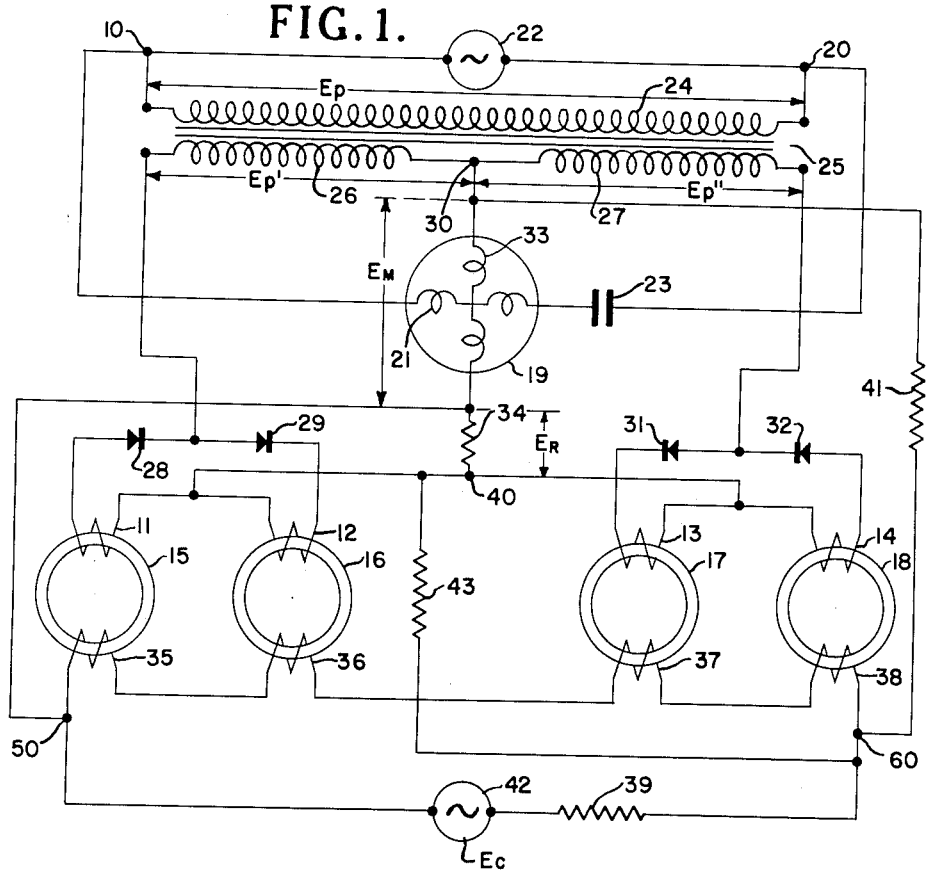
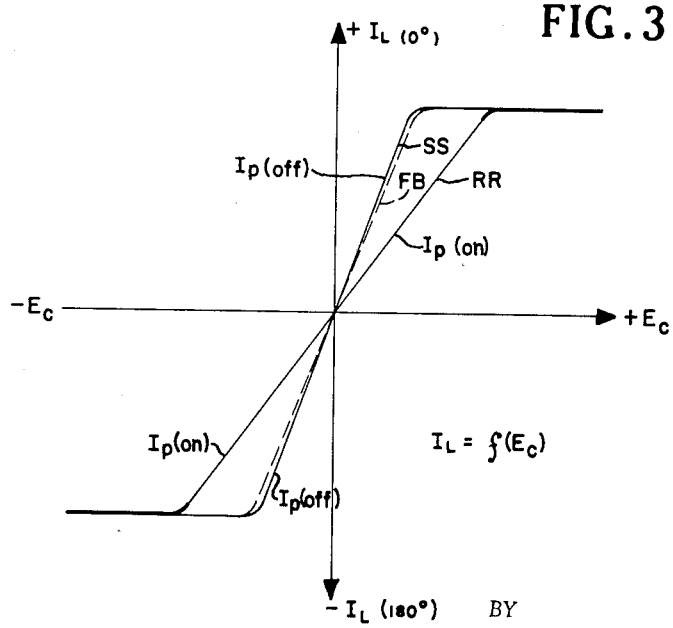
INVENTOR
W. A. GEYGER
BY
ATTORNEYS

United States Patent Office 2,743,407
Patented Apr. 24, 1956

2,743,407
MOTOR CONTROL BY MAGNETIC SERVO AMPLIFIER

Wilhelm A. Geyger, Takoma Park, Md., assignor to the United States of America as represented by the Secretary of the Navy Application November 30, 1953, Serial No. 395,330

4 Claims. (Cl. 318—207)

(Granted under Title 35, U. S. Code (1952), sec. 266)

The invention described herein may be manufactured and used by or for the Government of the United States of America for governmental purposes without the payment of any royalties thereon or therefor.

This invention relates to a compound feedback circuit for a full-wave push-pull connected magnetic servo amplifier of a character used with two-phase induction type reversible motors.

More specifically the invention relates to the elimination of unfavorable effects caused by the back electromotor force or E. M. F. of the reversible motor.

Prior full-wave push-pull operated magnetic amplifier circuits for two-phase servomotors have been tolerated with an undesirable drop in steepness of the transfer characteristic curve occurring with motor rotation, as contrasted to the static or steady state characteristic. This invention is directed to improvements in circuitry of the character described in the copending application to W. A. Geyger, Serial No. 276,027 filed March 11, 1952, for Magnetic Servo Amplifier.

At the static condition of the two-phase induction motor there occurs a specific transfer characteristic as hereinafter described in greater detail and possessing a definite steepness. As the motor is caused to rotate under control of the full-wave magnetic amplifier, the motor characteristics display a noticeable decrease in steepness of the transfer curve, and a reduction in the flow of current through the amplifier field winding of the motor. This field winding may thus be considered as displaying variable impedance characteristics which vary with speed of rotor rotation. This apparent effect appears to be due at least in part to the back E. M. F. developed with rotor rotation and causes the motor field to look like an impedance varying with speed. Since the back E. M. F. also varies with speed it is proposed to apply the voltage appearing across the amplifier field winding back to the amplifier control.

It has been observed that the instant invention as utilized to apply the back E. M. F. voltage to the control windings of the magnetic amplifier as positive regenerative feedback to effect an increased output correlative with rotor rotation and with the same error or control signal level, when combined with the proposed negative feedback voltage correlative with current flow through the amplifier field winding of the motor and applied to the amplifier as an additional control signal of a degenerative nature, tends to substantially restore and maintain the transfer characteristic curve at the steepness displayed under the static conditions. This relationship is maintained during changing conditions of rotation by the speed derivative negative feedback voltage which increases with rotor rotation, thereby to prevent overshooting and hunting of the motor as the error or control signal decreases.

This negative feedback loop provides dynamic damping of a character which is of a continuously increasing rate of change of feedback voltage with speed. Since it is applied degeneratively the motor is damped to a greater extent as the rate of error displacement of the rotor with respect to the control decreases.

It is a feature of this invention to provide a compound feedback arrangement for a reversible two-phase motor which applies the back E. M. F. developed across the amplifier field windings of the motor, as a positive or regenerative feedback to the amplifier control windings and additionally to provide a degenerative feedback to the control windings which is proportional to the current flowing through the same motor winding.

One object of this invention resides in new and improved means to eliminate undesirable effects of the back E. M. F. developed in the fields of a reversible two-phase induction motor which occurs with rotor rotation.

Another object of this invention resides in providing a compound feedback network for a two-phase induction type reversible motor wherein a combined feedback effect derived from a voltage across the amplifier field windings of the motor and a voltage proportional to the current flow through the same winding functions to restore the transfer characteristics to a value closely approximating the steady state characteristics, while maintaining adequate damping at all speeds.

Another object resides in improved circuitry for applying positive and negative feedback to both A. C. and D. C. controlled magnetic amplifiers of the full-wave push-pull operated varieties.

Other objects and many of the attendant advantages of this invention will be readily appreciated as the same becomes better understood by reference to the following detailed description when considered in connection with the accompanying drawings wherein:

Fig. 1 is a schematic diagram of an A. C. control circuit for a full-wave push-pull magnetic amplifier as utilized to control a two-phase reversible servomotor and comprising the compound feedback network of a preferred embodiment of the instant invention;

Fig. 2 is another embodiment of the instant invention utilizing a magnetic amplifier having D. C. control for the two-phase servomotor and including separate regenerative and degenerative feedback windings on the amplifier cores; and Fig. 3 is a graphical representation of the transfer characteristic curve under no-load or steady state condition and utilizing the instant compound feedback as compared with a transfer characteristic curve of a motor in operation in the absence of feedback.

Referring now to the drawing, figures in which like reference characters refer to like parts, and more particularly to Fig. 1 of the drawings which is directed to a preferred embodiment of the instant invention for use with A. C. control signals, there is shown a full-wave push-pull connected magnetic amplifier comprising load windings 11, 12, 13 and 14 on the four cores 15, 16, 17 and 18, respectively, and connected for control with the two-phase induction motor 19 in a manner hereinafter to be described.

The motor line field 21 is connected at 10 and 20 to the A. C. power source 22. This supply source 22 develops a voltage $E_p$ which is applied to the motor field 21 through the phasing capacitor 23. This power source also supplies the voltage $E_p$ to the primary winding 24 of the transformer 25, the center-tapped secondary windings 26 and 27 of which are connected to provide energization for two half wave magnetic amplifier circuits of opposite excitation polarity for operation under alternate conducting half-cycles conditions of the supply source. This provides a full-wave motor control circuit which in effect is energized by the separate half cycle parallel branch circuits for the magnetic amplifier load windings.

The amplifier load windings 11 and 12 of the double circuit are energized by the voltage $E_D'$ from one half of the transformer secondary 26, the circuit including the asymmetrical rectifier elements 28 and 29. These rectifiers are connected in an oppositely polarized arrangement such that positive half waves of current flow through rectifier 29 and winding 12 and negative half cycles flow through rectifier 28 and winding 11. The load windings 13 and 14 are connected to separate branch circuits wherein the winding 14 is considered to be energized by the positive half-cycle of voltages $E_D''$ developed by the transformer secondary 27 with current conduction through rectifier 32. The amplifier load winding 13 is considered to be energized by the voltage $E_D''$ from secondary winding 27 during the negative half-cycle with current conduction through rectifier 31.

The amplifier field winding 33 of the motor 19 is series connected from the transformer center tap 30 through the resistance element 34 to the branch circuit return junction 40 of the amplifier load windings. The series connected control windings 35, 36, 37 and 38 on the cores 15, 16, 17 and 18 respectively are wound in the same direction and connected through the series resistor 39 to the A. C. control voltage $E_c$ at 42. This A. C. voltage when applied to the control windings on the cores functions to differentially vary the saturation period of the cores during the cycle, which saturation period is herein termed the firing angle of the core.

The control signal voltage $E_c$ as applied to the cores through the control windings thereon is derived from an A. C. control source, and since the positive feedback voltage $E_M$ which is derived across the amplifier field winding 33 of the motor 19 is also of an A. C. nature, this feedback which is applied through the resistance element 41 may be applied directly across the control windings of the magnetic amplifier at 50 and 60.

The negative feedback which is represented by the voltage $E_R$ is derived across the resistance element 34 and is a voltage proportional to the current flowing through the amplifier field winding of the motor. This feedback signal also is of an alternating current nature and is applied through series resistance 43 across the amplifier control winding at 50 and 60. The resistance 34, across which the negative feedback voltage is derived, is of a low value and constitutes a substantially constant impedance in series with the motor amplifier field winding 33. This winding, however, may be considered as a variable impedance which varies with increasing motor speed due to the low value of current drawn by the motor winding with rotor rotation. This reduced current as shown by the lower curve RR of the Fig. 3 represents a decrease in the transfer characteristic of the rotor with rotation as compared to the steady state transfer curve characteristic SS with a no rotation condition, and both for a circuit not utilizing feedback. The effect of the compound feedback circuitry of this embodiment of the invention functions to restore the transfer characteristic to that of courve SS with rotation of the motor. Also by varying the circuit constants slight overcompensation or undercompensation may be achieved.

The full-wave magnetic amplifier circuit of Fig. 2 possesses line field and amplifier field circuitry for the motor which is generally similar to that of Fig. 1. It also utilizes similar load winding branch circuits for the magnetic amplifier. It differs therefrom in use of a reversible unidirectional voltage source for the control signal and suitable control windings connected for push-pull full-wave operation to provide motor reversal under D. C. control. The D. C. control windings 35', 36', 37' and 38' respectively for the cores 15', 16', 17' and 18' are connected with the winding turns of 35' and 36' in series opposition with each other and in series with windings 37' and 38'; the respective winding turns of which are also series opposed.

The feedback circuitry of this embodiment utilizes separate series connected degenerative feedback windings 55, 56, 57 and 58 for A. C. control on each core; the respective winding turns of which are all in the same direction. The circuitry additionally utilizes separate series connected regenerative or positive feedback windings of a similar character for A. C. control on each core. These series connected regenerative windings 45, 46, 47 and 48 are connected directly across the amplifier field windings of the motor and through series resistor 41' for feedback of a voltage corresponding to the back electromotive force of the motor during rotation and represented by $E_M$ to apply a control for the magnetic amplifier through these positive feedback windings. This voltage which is opposite in direction to the amplifier output voltage represents a positive feedback which varies with speed of rotation.

The loop for degenerative feedback for motor damping control is connected to apply the A. C. voltage $E_R$ which appears across the resistor 34' connected in series with motor control field winding 33 to the series connected feedback windings 55, 56, 57 and 58. The voltage $E_R$ developed across the constant impedance resistance element 34' is thus applied as a degenerative feedback proportional to current flow through windings 33.

Referring again to Fig. 3 there appears a representation of the improvement in the transfer characteristic obtained by the use of feedback circuitry of Figs. 1 and 2 as compared to the transfer curve RR for rotating rotor conditions of a magnetic amplifier controlled motor in a circuit without feedback. The steady state curve SS is obtained by opening the circuit from 22 through line field winding 21 and measuring the load current $I_L$ flowing through field winding 33 for varying values of signal voltage. The drop in the transfer characteristic curve between the steady state curve SS and the curve RR of a noncompensated magnetic amplifier controlled motor which is apparent with energization of winding 21 and with the motor in rotation, may be substantially restored by application of positive and negative feedback as taught by the instant invention. This compound feedback provides a transfer curve approximating or substantially coinciding with that of SS as indicated by curve FB.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In combination with a full wave magnetic amplifier circuit of the character described and including a reversible alternating current motor having at least two field windings, one winding of which is connected for control by said amplifier, means for providing a regenerative feedback control for said amplifier which is proportional to the back electromotive force generated in the said motor winding which is amplifier controlled and with motor rotor rotation, and means for providing a degenerative feedback control proportional to the current flow through the said amplifier controlled winding of the motor.

2. A control circuit for a reversible alternating current motor of a character having a controlled field winding, and a line field winding comprising a full wave magnetic amplifier having control windings and load windings thereon, said load windings being connected to said controlled field winding of said motor, means connected across said controlled field winding and between this said winding and the control windings of said magnetic amplifier to overcome back E. M. F. effects produced in said controlled field winding, and means to provide feedback from said controlled winding of the motor to the amplifier control windings of a character proportional to the current flow through said controlled field winding.

3. A magnetic amplifier circuit of a character incorporating load windings and amplifier control windings for improving the control transfer characteristics of an alternating current induction motor connected thereto wherein said motor is of a character having a line field winding and an amplifier controlled field winding, comprising means for deriving and applying a first feedback signal to the amplifier control windings of a character proportional to the back E. M. F. produced in the amplifier controlled field windings of the motor with rotor rotation and means connected in said circuit for simultaneously applying a second feedback signal to the amplifier control windings which is proportional to current flow through the amplifier field winding of the motor.

4. A magnetic amplifier control circuit for a two-phase induction motor having first and second field windings comprising a pair of saturable reactor cores each having a controlled winding and a control winding wound thereon, means including a source of A. C. potential and said controlled windings for causing said cores to saturate each on alternate half cycles of said A. C. potential, means including the control windings on said cores for differentially varying the firing angles of said cores in response to a control signal, means for applying a pulsating unidirectional current correlative with the current flowing through the controlled windings to said first field winding of said induction motor, means for energizing said second field winding of said motor, means for providing a regenerative feedback control proportional to the back electromotive force developed in the motor windings with motor rotation, and means for providing a degenerative feedback control proportional to the current flowing through the amplifier controlled winding of the motor.

References Cited in the file of this patent
UNITED STATES PATENTS

| | | |
|---|---|---|
| 2,677,796 | Geyger | May 4, 1954 |
| 2,683,843 | Geyger | July 13, 1954 |
| 2,683,845 | Geyger | July 13, 1954 |